United States Patent [19]

Najjar

[11] Patent Number: 4,957,544
[45] Date of Patent: Sep. 18, 1990

[54] PARTIAL OXIDATION PROCESS INCLUDING THE CONCENTRATION OF VANADIUM AND NICKEL IN SEPARATE SLAG PHASES

[75] Inventor: Mitri S. Najjar, Wappingers Falls, N.Y.

[73] Assignee: Texaco, Inc., White Plains, N.Y.

[21] Appl. No.: 401,705

[22] Filed: Sep. 1, 1989

[51] Int. Cl.$^5$ .................................. C21B 3/04
[52] U.S. Cl. ........................ 75/500; 48/DIG. 2
[58] Field of Search ........................... 75/25, 24

[56] References Cited

U.S. PATENT DOCUMENTS

| | | | |
|---|---|---|---|
| 2,467,039 | 4/1949 | Kerschbaum | 75/24 |
| 3,579,328 | 5/1971 | Aas | 75/24 |
| 3,753,681 | 8/1973 | Vojkovic | 75/24 |
| 4,816,236 | 3/1989 | Gardner | 75/25 |

Primary Examiner—Peter D. Rosenberg
Attorney, Agent, or Firm—Robert A. Kulason; James J. O'Loughlin; Albert Brent

[57] ABSTRACT

An ash-containing fuel feedstock comprising petroleum coke and/or heavy liquid hydrocarbonaceous fuel, wherein said ash comprises compounds of V, Ni, and Si in admixture with an iron-containing additive, is subjected to partial oxidation to produce a hot raw effluent stream of synthesis gas, reducing gas, or fuel gas with entrained molten slag. The hot raw effluent gas steam is cooled and coarse slag is separated. The coarse slag is heated to a temperature in the range of about 1900° F. to 2600° F. and above the melting point of said slag while in contact with reducing gas in a thermal reduction zone to produce a molten bath of slag comprising the following separable immiscible phases in wt. %.

(a) a dense metal phase in the amount of about 0.1 to 5.0 which precipitates to the bottom comprising a nickel-iron alloy containing about 5 to 60 wt. % of nickel;
(b) a sulfur encapsulated slag phase in the amount of about 5.0 to 85 that floats on said phase (a) comprising iron silicate;
(c) the remainder comprising vanadium-rich silicate and spinel phases comprising at least 3 wt. % vanadium which floats on said phase (b). The three molten phases (a), (b), and (c) are then separated from each other.

12 Claims, 2 Drawing Sheets

FIELD OF VISION = 0.2 mm

FIELD OF VISION = 0.2 mm

FIELD OF VISION = 0.2 mm

PARTIAL OXIDATION PROCESS INCLUDING THE CONCENTRATION OF VANADIUM AND NICKEL IN SEPARATE SLAG PHASES

FIELD OF THE INVENTION

This invention relates to the partial oxidation of an ash-containing feedstock comprising petroleum coke or heavy liquid hydrocarbonaceous fuel or mixtures thereof to produce synthesis gas, reducing gas, or fuel gas and entrained molten slag which is further processed to produce separate by-product streams of vanadium-rich slag comprising at least 3.0 weight percent (wt. %) vanadium (basis weight of slag) and nickel-containing slag e.g. at least 5.0 wt % nickel (basis weight of slag). More particularly it pertains to a process for producing synthesis gas while concentrating nickel and vanadium-containing contaminants from the fuel feedstock in separate slag phases for use as valuable by-products.

The partial oxidation of liquid hydrocarbonaceous fuels such as petroleum products and slurries of solid carbonaceous fuels such as coal and petroleum coke are well known processes. However, troublesome molten slags are produced along with the product gas in the free-flow unobstructed vertical reaction zone of the partial oxidation gas generator. At the high temperature e.g., about 2700° F. to 3000° F. prevailing in the reaction zone, the highly corrosive molten slag attacks the refractory which lines the reaction zone. Lining failures have sometimes occurred within a few hundred hours. An additive system is provided by the subject invention wherein the molten slag runs freely from the gasifier. The life of the refractory lining is extended. Costly down-times for replacement of the refractory lining are thereby avoided.

Previous gasification runs with petroleum coke and/or ash containing heavy liquid hydrocarbonaceous fuel gave rise to some unexpected operating problems. The ash, which normally melts and is discharged form the gasifier as a slag, was not melting completely and being discharged but was building up on the walls of the refractory. Vanadium and nickel constituents of the ash in said materials collected on the gasifier walls and formed oxides during shut-down. Upon subsequent exposure of the gasifier walls to air these deposits involving vanadium can catch fire with vanadium converting to the lower melting $V_2O_5$ or metal vanadate states. The strong solvent action of vanadium oxide on the refractory lining contributed to the clogging of the outlet in the bottom of the gasifier. Nickel impurities may under certain conditions form troublesome nickel oxide and nickel sulfide downstream in the system. Fluxing as used in coal operations and in U.S. Pat. Nos. 1,799,885 and 2,644,745 does not provide a solution to applicants' problem involving troublesome vanadium and nickel. The subject invention is an improvement in the art since it permits long time operation of the partial oxidation gas generator without shut-down due to failure of the refractory lining in the reaction zone that was brought about by the presence of vanadium. Further valuable by-product vanadium enriched and nickel enriched slag phases are produced.

The foreseeable trend for petroleum reserves is that the produced crude will be increasingly heavier and of poorer quality. To compensate for this trend, refiners must employ more "bottom of the barrel" upgrading to provide the desired light products. The current industry workhouse to provide this upgrading is some type of coking operation (either delayed or fluid). A good deal of current refinery expansion includes the installation or expansion of coker units; and thus, coking will be a process of general use for some time to come. Since the crudes contain more contaminants, i.e. sulfur, metals (predominately vanadium, nickel, and iron) and ash, and these contaminants are concentrated in the product coke, this coke is of a much poorer quality and is excluded from its normal product applications. Because the crudes are heavier, i.e., contain more coke precursors, more of this poorer quality coke is produced from each barrel of ash-containing heavy liquid hydrocarbonaceous fuel. The manufacture of petroleum coke pellets by a delayed coking process is described in coassigned U.S. Pat. No. 3,673,080. A fluid coking process is described in U.S. Pat. No. 2,709,676.

By conventional partial oxidation gasification processes, when sulfur-containing compounds are present in the fuel feedstock, sulfur containing gases e.g. $H_2S$ and COS in the amount of about 0.1 to 2.0 mole % are produced along with the $H_2 + CO$. These sulfur-containing gaseous impurities are undesirable. They corrode piping and equipment upon contact; and, they deactivate catalysts. Ordinarily raw gas streams from the reaction zone may require additional downstream gas purification in order to remove the sulfur-containing gases. The need for means to remove a major portion of the sulfur in synthesis gas as generated by the partial oxidation process is widely recognized. In particular, removal of sulfur from synthesis gas at high temperature is of great interest. The combined-cycle thermal efficiency is improved by eliminating the need to cool the product gases prior to low-temperature acid-gas wet scrubbing. Gaseous impurities, including $H_2S$, COS and $CO_2$ are removed from raw synthesis gas by low temperature condensation and by solvent absorption in a separate gas purification operation located downstream from the gas generator in coassigned U.S. Pat. No. 4,052,176. Further, in said process, it is necessary to cool the hot raw gas stream from a temperature of 2700° F. to −70° F. before the sulfur-containing gas are separated. Advantageously, the subject invention described herein employs a vertical free-flow unobstructed refractory lined generator operating in the slagging mode and in an extremely reducing atmosphere. The hot effluent gas stream is desulfurized with substantially no reduction in temperature. Further, the life of the refractory lining in the gas generator is increased. Also, a portion of lining in the gas generator is increased. Also, a portion of the iron is tied up in the molten ash as iron silicates and sulfides. There is substantially no elemental iron.

SUMMARY OF THE INVENTION

This is a process for the production of gaseous mixtures comprising $H_2 + CO$ by the partial oxidation of a feed-stock comprising an ash-containing fuel feedstock comprising petroleum coke and/or heavy liquid hydrocarbonaceous fuel, wherein said feedstock includes a minimum of 0.5 wt % sulfur and said ash includes a minimum of 5.0 wt. % of vanadium, such as about 5.0 to 20 wt. %; a minimum of 2.0 wt. % of nickel, such as about 2.0 to 20 wt. %; a minimum of 2.0 wt. % of silicon, such as about 2 to 30 wt. %; and a minor amount of calcium and sodium e.g. less than about 5 wt % of the ash. The process includes the steps of:

(1) reacting an ash-containing fuel feedstock comprising petroleum coke and/or heavy liquid hydrocarbonaceous fuel, wherein said ash comprises compounds of V, Ni and Si, by partial oxidation in a free-flow unobstructed vertical gas generator in the presence of a free-oxygen containing gas, temperature moderator, and an iron-containing additive in the amount of about one to ten parts by weight of additive to one part by weight of the ash in said fuel feedstock and there is at least 10 parts by weight of iron for each part by weight of vanadium, at a temperature in the range of about 2100° F. to 3000° F., a pressure in the range of about 1 to 200 atmospheres, an O/C (atomic ratio) in the range of about 0.3 to 1.5, and a $H_2O$/fuel feedstock weight ratio in the range of about 0.1 to 5.0 to produce a hot raw effluent stream of synthesis gas, reducing gas, or fuel gas with entrained molten slag, and carbon-containing particulate material;

(2) cooling the hot raw gas stream from (1), and separating coarse slag from fine slag and carbon-containing particulate materials;

(3) heating the coarse slag from (2) while in contact with reducing gas in a thermal reduction zone wherein an equilibrium oxygen concentration is provided in the gas phase with a partial pressure of oxygen in the range of about $8.4 \times 10^{-20}$ to $1.1 \times 10^{-10}$ atmosphere and at a temperature in the range of about 1900° F. to 2600° F. and above the melting point of said slag to produce a molten bath of slag comprising the following immiscible phases in wt. %:

(a) a dense metal phase in the amount of about 0.1 to 5.0 which precipitates to the bottom comprising a nickel-iron alloy containing about 20 to 70 wt. % of nickel;

(b) a sulfur encapsulated slag phase in the amount of about 5.0 to 85 that floats on said phase (a) comprising iron silicate, (c) the remainder comprising vanadium-rich silicate and spinel phases comprising at least 3 wt. % vanadium which floats on said phase (b); and (4) separating said phases (a), (b) and (c) from each other.

In another embodiment, an element selected from the group consisting of copper, calcium, silicon, and mixtures thereof is introduced into the reaction zone. These additional elements help in sulfur removal and slag formation. Further, they are provided in the total amount of about 1.0 to 90.0 wt. % of the iron containing additive.

BRIEF DESCRIPTION OF THE DRAWING

The invention will be further understood by reference to the accompanying drawing in which.

DISCLOSURE OF THE INVENTION

Figure 1:
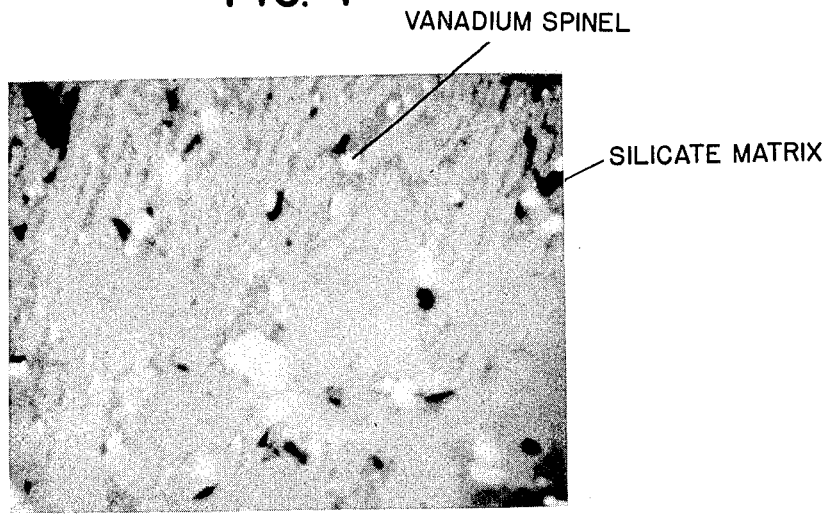
FIG. 1 is a photomicrograph taken before the reduction treatment showing a silicate matrix of coarse slag with dispersed vanadium spinels.

The partial oxidation of heavy liquid hydrocarbonaceous fuel and petroleum coke are described respectively in coassigned U.S. Pat. Nos. 4,411,670 and 3,607,156, which are incorporated herein by reference. Further, suitable free-flow refractory lined gas generators and burners that may be used in the production of synthesis gas, reducing gas, or fuel gas from these materials are also described in the aforesaid references. Advantageously, the subject process uses relatively inexpensive feedstocks comprising ash-containing heavy liquid hydrocarbonaceous fuel and/or petroleum coke feedstocks having nickel and vanadium-containing ashes. Further, said feedstock includes a minimum of 0.5 wt % of sulfur, such as at least 2.0 wt. % sulfur; and said ash includes a minimum of 5.0 wt. % of vanadium, such as about 5.0 to 20.0 wt. %, a minimum of 2.0 wt. % of nickel, such as about 2.0 to 20 wt. %; a minimum of 2.0 wt. % of silicon, such as about 2 to 30 wt. %; and a minor amount of calcium and sodium e.g. less than 5 wt. % of the ash.

By definition, the term ash-containing heavy liquid hydrocarbonaceous material or fuel having a nickel and vanadium-containing ash is a petroleum or coal derived fuel having the composition specified above and selected from the group consisting of virgin crude, residua from petroleum distillation and cracking, petroleum distillate, reduced crude, whole crude, asphalt, coal tar, coal derived oil, shale oil, tar sand oil, and mixtures thereof.

By definition, the term ash-containing petroleum coke having a nickel and vanadium-containing ash is a petroleum coke made from ash-containing heavy liquid hydrocarbonaceous fuel by conventional coking methods such as by the delayed or fluid coking process, such as described in coassigned U.S. Pat. No. 3,673,080, which is incorporated herein by reference.

A close study of the ashes derived from the partial oxidation, without an additive, of a feedstock comprising heavy liquid hydrocarbonaceous fuels and/or petroleum coke having nickel and vanadium-containing ashes shows that they are largely composed of oxide and sulfide compounds of vanadium, nickel, iron, along with some normally occurring mineral matter species. Vanadium-containing oxide laths are present and may be selected from the group consisting of V, V+Ca, V+Fe, V+Al, and mixtures thereof. Vanadium-containing spinels are present of the spinel-type aluminate phases and may include any metal selected from the group consisting of V, Fe, Cr, Al, Mg and mixtures thereof. The presence of abundant interlocking needle to lath-like crystals is the cause of the high viscosity of the slag. Advantageously, such interlocking is substantially absent in the slag from the subject process.

The metals present in the ash derived in the subject process provide a system that is significantly different from that occurring in coal. A further factor is that the total ash content of the petroleum coke or heavy liquid hydrocarbonaceous fuel may be only about one-half to 5 weight percent (wt. %), whereas coal typically contains 10–20 wt. % ash. The comparatively low ash concentration in petroleum coke and heavy liquid carbonaceous fuel may be the reason why the ash removal problem is only noticed after prolonged gasifier runs. The chance for effective ash and additive mixing that is necessary to wash the vanadium constituents out of the reaction zone or for effective fluxing is therefore greatly reduced.

It is theorized that in the heavy liquid hydrocarbonaceous material and petroleum coke systems, a good deal of the ash material is liberated as individual molecular species. This is because upon vacuum distillation or coking, the metallic species in the crude, which are generally present as porphyrin type structures (metal atoms, oxides or ions thereof confined in an organic framework), are entrapped within the collapsed carbon matrix.

Problems arise when the heavy metal constituents buildup in the system. In particular, vanadium and nickel are known to accumulate on the walls of the refractory lined reaction zone of the partial oxidation gas generator and not flow smoothly from the gasifier under normal gasifier conditions. During shut down and subsequent exposure of the gasifier walls to air, these deposits involving vanadium can catch fire with the vanadium converting to the lower melting $V_2O_5$ or metal vanadate states. These materials prove to be very corrosive to refractory thereby decreasing the life of the refractory lining of the reaction zone. These problems and others are minimized by the subject process in which the amount of vanadium constituents remaining in the reaction zone are substantially reduced or eliminated. Further by the subject process which includes a thermal reduction step, the vanadium and nickel in the fuel feedstock are concentrated in separate slag phases. Thus, a vanadium enriched slag phase is produced comprising at least 3 wt. % vanadium. Also, a separate nickel enriched slag phase is produced comprising at least 25 wt. % nickel. These metal enriched slag phases may be sold to a metal reclaimer for the production of V and Ni materials which are used in the production of high strength alloy steels, or for other purposes e.g. catalysts.

In the manner provided in coassigned U.S. Pat. 4,826,627, which is incorporated herein by reference, an iron-containing additive is introduced into the partial oxidation reaction zone along with the fuel feedstock, free-oxygen containing gas and temperature moderator. A first portion of the additive combines with at least a portion of the nickel, iron and sulfur constituents found in the feedstock to produce an oxy-sulfide liquid phase washing agent. A second portion of the additive combines with at least a portion of the silicon, aluminum, calcium, sodium, and/or potassium and iron constituents found in the feedstock to produce a silicate liquid phase washing agent. The oxy-sulfide and silicate liquid phase washing agents collect and transport at least a portion of the vanadium-containing oxide laths and spinels and other ash components out of the reaction zone as said molten slag.

A suitable amount of iron-containing additive is introduced into the reaction zone along with the fuel feedstock in order to satisfy the following two ratios: (i) a wt. ratio of iron-containing additive to ash (noncombustible material) in the reaction zone in the range of about 1.0-10.0 to 1.0, such as in the range of about 1-6 to 1: and (ii) at least 5 parts by weight, such as about 10-30, say 20 parts by weight of iron for each part by weight of vanadium.

Advantageously by the subject process, the oxy-sulfide washing phase which is produced in the partial oxidation reaction zone has a low viscosity in comparison with prior art high viscosity slag. This facilitates slag removal. Further, at shutdown of the gasifier, the inside surfaces of the top dome and refractory walls of the reaction zone may be rendered clean and with substantially no accumulation of vanadium contaminants.

It was unexpectedly found that a preferred iron-containing additive for mixing with the heavy liquid hydrocarbonaceous material having nickel and vanadium-containing ash or petroleum coke having a nickel and vanadium-containing ash is selected from the group consisting of elemental iron; iron compounds including oxides, sulfides, carbonates, cyanides, nitrates; and mixtures thereof. In another embodiment, the iron compound is a water soluble iron salt. In still another embodiment, the iron compound is a ferro or ferri organic compound selected from the group consisting of naphthenates, oxalates, acetates, citrates, benzoates, oleates, tartrates, and mixtures thereof.

In another embodiment, it was unexpectedly found that other benefits could be achieved by introducing into the partial oxidation reaction zone along with the iron containing additive, an additional material including an element selected from the group of elements consisting of copper, calcium, silicon, and mixtures thereof. The total amount of said additional materials may be in the range of about 1.0 to 90.0 wt. %, such as about 10.0 to 50.0 wt. % of the iron-containing additive. The addition of the aforesaid supplemental amount of materials improve the fluidity of the slag. The life of the refractory lining is thereby extended. Suitable copper-containing materials may be selected from the group consisting of oxide, sulfide, sulfate, hydroxide, carbonate, cyanide, chloride, nitrate and mixtures thereof. In another embodiment, the copper-containing additive is a copper compound selected from the group consisting of naphthenate, oxalate, acetate, benzoate, oleate, tartrate, and mixtures thereof. The calcium-containing additive may be an inorganic calcium compound selected from the group consisting of oxide, hydroxide, carbonate, hydride, nitrate, phosphate, and mixtures thereof. Further, organic calcium compounds may be used selected from the group consisting of formate, oxalate, acetate, stearate, benzoate, tartrate, and mixtures thereof. Suitable silicon-containing additives are selected from the group consisting of silica, quartz, volcanic ash, and mixtures thereof. For example, for supplemental additives see coassigned U.S. Pat. Nos. 4,668,428; 4,668,429; 4,657,698; 4,732,700; and 4,826,627, which are incorporated herein by reference.

The preferable particle size of the comminuted iron containing additive and the comminuted petroleum coke is in the range of ASTM E-11 Standard Sieve Designation about 212 microns to 38 microns, or below. The ingredients of the aforesaid mixtures may be separately ground and then mixed together. Alternatively, the ingredients may be wet or dry ground together. Intimate mixing of the solid materials is thereby achieved, and the particle sizes of each of the solid materials in the mixture may be substantially the same. The dry ground mixture may be mixed with water or a liquid hydrocarbonaceous materials or both to produce a pumpable slurry having a solids content in the range of about. 5–65% wt. %. The slurry is then gasified by partial oxidation in the manner previously, described. Alternatively, the solid materials may be wet ground with the liquid slurry medium. In another embodiment, the mixture of particulate solids may be entrained in a gaseous medium and then introduced into the partial oxidation gas generator. The gaseous transport medium may be selected from the group consisting of steam, $CO_2$, $N_2$, free-oxygen containing gas, recycle product gas, and mixtures thereof.

The partial oxidation reaction takes place in a reducing atmosphere under the following conditions: temperature about 2100° F. to 3000° F., such as about 2300° F. to 2600° F., say about 2725° F. to 2825° F., further, the temperature in the reaction zone is about 100° F. to 500° F. above the fluid temperature of the slag; pressure is about 1 to 200 atmospheres; $H_2O$/fuel weight ratio is in the range of about 0.1 to 5.0, such as about 0.2 to 1.0; and atomic ratio of free oxygen to carbon in the fuel (O/C ratio) is in the range of about 0.3 to 1.5, such as about 0.8 to 1.4.

The composition of the hot, raw effluent gas stream directly leaving the reaction zone of the free-flow partial oxidation gas generator is about as follows, in mole percent: $H_2$ 10 to 70, CO 15 to 57, $CO_2$ 0.1 to 30, $H_2O$ 0.1 to 20, $CH_4$ nil to 20, $H_2S+COS$ 0.10 to 2.0, $N_2$ nil to 60, and $A_r$ nil to 2.0. Depending on the composition, after removal of the entrained particulate carbon and slag by quench cooling and/or scrubbing with water and with or without dewatering, the gas stream may be employed as synthesis gas, reducing gas or fuel gas.

An annular-type burner is used to introduce the ash-containing fuel feedstock into the gasifier. Suitable annular-type burners are shown and described in coassigned U.S. Pat. Nos. 3,847,564; 4,364,744; and 4,525,175, which are incorporated herein by reference. The burner is located in the top of the gas generator along the central vertical axis. A typical down-flowing free-flow unobstructed vertical refractory lined partial oxidation synthesis gas generator is shown in coassigned U.S. Pat. No. 2,818,326, which is incorporated herein by reference.

The term free-oxygen containing gas, as used herein is intended to include air, oxygen-enriched air, i.e. greater than 21 mole % oxygen, and substantially pure oxygen i.e. greater than 95 mole % oxygen (the remainder comprising $N_2$ and rare gases). Free oxygen containing gas may be introduced into the burner at a temperature in the range of about ambient to 1000° F.

The use of a temperature moderator to moderate the temperature in the reaction zone of the gas generator depends in general on the carbon to hydrogen ratio of the feedstock and the oxygen content of the oxidant stream. Suitable temperature moderators include steam, water, $CO_2$-rich gas, liquid $CO_2$, recycle product gas, a portion of the cooled clean exhaust gas from a gas turbine that may be employed downstream in the process, by-product nitrogen from the air separation unit used to produce substantially pure oxygen, and mixtures of the aforesaid temperature moderators. Water may serve as a carrier and a temperature moderator with petroleum coke slurries. However, steam may be the temperature moderator with slurries of liquid hydrocarbon fuels and petroleum coke. The temperature moderator may be introduced into the gas generator in admixture with either the ash-containing fuel feedstock, the free-oxygen containing gas stream, or both. Alternatively, the temperature moderator may be introduced into the reaction zone of the gas generator by way of a separate conduit in the fuel burner. When $H_2O$ is introduced into the gas generator either as a temperature moderator, a slurrying medium, or both, the weight ratio of $H_2O$ to fuel is in the range of about 0.1 to 5.0 and preferably in the range of about 0.2 to 1.0.

The relative proportions of ash-containing fuel feedstock, water or other temperature moderator, free-oxygen containing gas in the feed streams to gas generator, are carefully regulated to convert a substantial portion e.g. 75 to 95 wt. %. such as 80 to 90 wt. % of the carbon in the fuel feed to the partial oxidation gas generator to carbon oxides e.g. CO and $CO_2$; and, to maintain an autogenous reaction zone temperature in the range of about 2200° F. to 2700° F. and above the ash-fusion temperature of the slag formed in the reaction zone. Molten slag is much easier to separate from the hot effluent gas than fly ash. Entrained in the raw effluent gas stream from the gas generator is about 1.0 to 10 wt. %, such as 2 to 4 wt. % of porous carbon-rich particulate material (basis weight of carbon in the feed to the gas generator). Molten slag resulting from the fusion of the ash content e.g. mineral matter in the fuel feedstock is also entrained in the gas stream leaving the generator. The content of mineral matter in the fuel feedstock is about 0.5 to 20 wt. %.

At least a portion e.g. about 20 to 100 volume % of the effluent gas stream leaving the reaction zone of partial oxidation gas generator is passed through the unobstructed central axial passage at the bottom of the reaction zone. The remainder, if any, is directed through an outlet in the side wall of the gas generator.

The hot raw effluent gas stream exits from the partial oxidation gas generator and may be cooled to a temperature in the range of about 60° to 950° F., such as less than about 350° F. For example, the hot gas stream may be first partially cooled by direct contact with water contained in a quench tank, such as shown in coassigned U.S. Pat. No. 4,218,423, which is incorporated herein by reference. Molten slag is solidified by the quench water and most of the coarse slag particles and carbon-rich particulate material are transferred to the water in the quench tank. The coarse slag particles comprise about 99 wt. % of inorganic materials and less than about 1 wt. % of unconverted carbon. The coarse slag material has a particle size of 40 mesh or more. The carbon-rich particulate matter comprises about 10 to 80 wt. % carbon, such as about 51.2 wt. %; about 20 to 90 wt. % ash, such as about 47.1 wt. %; and about 0 to 15 wt. % of $H_2O$, such as about 1.7 wt. %. The carbon-rich material has a particle size of less than about 40 mesh. The partially cooled gas stream may be then passed through a water scrubbing operation to remove any remaining entrained particulate matter. The pressure in the quench tank is substantially the same as the gas generator located above. A portion of the quench water at the bottom of the quench tank is removed by way of a lockhopper system and settler, such as shown in coassigned U.S. Pat. No. 3,607,157, which is incorporated herein by reference. Another stream of quench water carrying fine particles exits the gasifier quench chamber in response to a liquid level controller and is directed to a settler. Clarifier bottoms or tops are separated from the water and have a composition similar to the previously described carbon-rich particulate matter.

Alternatively, the hot raw effluent gas stream from the reaction zone may be partially cooled, by indirect heat exchange, prior to being scrubbed with water, by being passed through a radiant or convection gas cooler. For example, see coassigned U.S. Pat. Nos. 2,931,715; 4,081,253; and 4,377,132; which are incorporated herein by reference. Coarse slag particles and carbon-rich particulate material may pass from the water sump of the gas cooler and be collected in a lockhopper vessel. The solids and water from the lockhopper may then flow by gravity into a water sump or settler where optionally the coarse slag particles and the finer carbon-rich particulate material are removed and separated from each other. For example, a portion of the quench water at the bottom of the quench tank 26 is removed by way of a lockhopper 37 and settler 40 as shown in the drawing for coassigned U.S. Pat. No.

3,544,291, which is incorporated herein by reference. The aqueous suspensions of particulate matter selected from the group consisting of coarse slag, carbon-rich particulate matter and mixtures thereof in lines 39, 41 and 42 of U.S. Pat. No. 3,544,291 have solids concentrations in the range of about 1.0 to 50.0 wt. %, such as about 10 to 20 wt. %. For example, the overflow stream in line 41 of the drawing in coassigned U.S. Pat. No. 3,544,291 may have a solids content of carbon-rich particulate matter in the range of about 1.0–4.0 wt. %. The underflow in line 42 may be used as filler material. Coarse slag having a particle size of at least 40 mesh is separated from fine slag having a particle size of less than 40 mesh and carbon-containing particulate material having a particle size of less than 40 mesh by conventional methods. The coarse slag comprises about 0.1 to 2.0 wt. % of vanadium and contains most of the additive e.g. more than 80 wt. % iron-containing additive. The fine slag and clarifier bottoms comprises 10–90 wt. % of unconverted carbon and the remainder comprises inorganic-containing ash material. The carbon-containing particulate material comprises about 90 wt. % carbon, or more and the remainder ash. Additional carbon values e.g. up to 5.0 wt. % (basis weight of said coarse slag) may be optionally introduced into the thermal reduction zone by mixing with the coarse slag a portion of at least one of the following materials; fine slag, carbon-containing clarifier bottoms, carbon-containing particulate material, and mixtures thereof.

The coarse slag, with or without admixture with any of said fine slag, clarifier bottoms, and/or carbon-containing particulate material, is introduced into a thermal reduction zone wherein an equilibrium oxygen concentration is provided in the gas phase with a partial pressure of oxygen in the range of about $8.4 \times 10^{-20}$ to $1.1 \times 10^{-10}$ atmosphere. Further, a temperature in the range of about 1900° F. to 2600° F. and above the melting point of said slag is maintained for a period in the range of about 2 minutes to 3 hours, such as about 5 minutes to 30 minutes while said coarse slag is in contact with reducing gas. The reducing gas is selected from the group consisting of $H_2$, gaseous mixtures of $H_2+CO$, a portion of the product gas, and mixtures thereof. The pressure is in the range of about 1 to 200 atmospheres. A molten bath of slag is produced comprising the following immiscible phases in wt. %.

(a) a dense metal phase in the amount of about 0.1 to 5.0 which precipitates to the bottom of the thermal reduction zone comprising a nickel-iron alloy containing about 5 to 60 wt. % of nickel;

(b) a sulfur-encapsulated slag phase in the amount of about 5.0 to 85 that floats on said phase (a) comprising iron silicate; advantageously, the sulfur in the fuel feedstock becomes encapsulated in the iron silicate slag phase and may be safely disposed of without contaminating the environment; and the remainder comprising (c) vanadium rich silicate and spinel phases comprising at least 3 wt. % vanadium which float on said phase (b).

The thermal reduction zone may be any conventional closed vessel or autoclave suitable for being heated to high temperature e.g. up to 3000° F. for extended periods of time and capable of withstanding moderate pressures. Any refractory linings should be able to withstand any attack by the molten slag. A conical shaped, valve controlled discharge port in the bottom of the vessel aligned along the central vertical axis may be used to successively draw-off and thereby separate from each other, the three molten phases.

EXAMPLES AND DESCRIPTION OF DRAWING

The following examples are offered for a better understanding of the present invention, but the invention is not to be construed as limited thereto.

Synthesis gas is produced in a vertical free-flow unobstructed refractory lined partial oxidation reaction zone, such as that shown and described in coassigned U.S. Pat. No. 3,607,157, which is incorporated herein by reference. The feedstock comprises an atomized aqueous dispersion of petroleum coke having a nickel and vanadium-containing ash. The petroleum feedstock contains about 3.2 wt % of sulfur and more than 350 ppm of silicon. The ash in the petroleum coke comprises about 12.0 wt. % of vanadium, and about 5.0 wt. % of nickel. The petroleum coke is mixed with iron and calcium containing additives comprising about 90 wt. % iron oxide, and 10 wt. % of calcium-containing material. The wt. ratio of iron and calcium-containing additive to ash is about 5.0 to 1. The weight ratio of iron and calcium-containing additive to vanadium in the reaction zone is about 16 to 1. The solids content of the slurry is about 60 wt. %.

The petroleum coke is reacted with a free oxygen containing gas e.g. air, oxygen-enriched air, substantially pure oxygen, in the presence of a temperature moderator e.g. $H_2O$ in the refractory lined partial oxidation reaction zone at an autogenous temperature of about 2500° F. and a pressure of about 10 atmospheres. The molten slag droplets are readily separated from the hot effluent gas stream leaving the reaction zone by gravity or by quenching and/or scrubbing the gas stream with water or other gas scrubbing medium.

FIG. 1 of the drawing is a photomicrograph of the coarse slag showing an iron silicate matrix with dispersed vanadium spinels.

The coarse slag is heated to a temperature of about 2500° F. and above the melting point of said slag while in a thermal reduction zone wherein an equilibrium oxygen concentration is provided in the gas phase with a partial pressure of oxygen of about $7.6 \times 10^{-18}$ to produce a molten bath of slag comprising the following immiscible phases in wt. %.

(a) a dense nickel-iron alloy phase in the amount of about 3.0 which precipitates to the bottom of the reduction zone and comprising about 20 wt. % nickel.

(b) a sulfur encapsulated slag phase in the amount of about 75 wt. % that floats on said nickel-iron alloy phase (a); and the remainder comprising (c) vanadium-rich silicate and spinel phases comprising at least 3 wt % vanadium which floats on phase (b).

Figure 2:
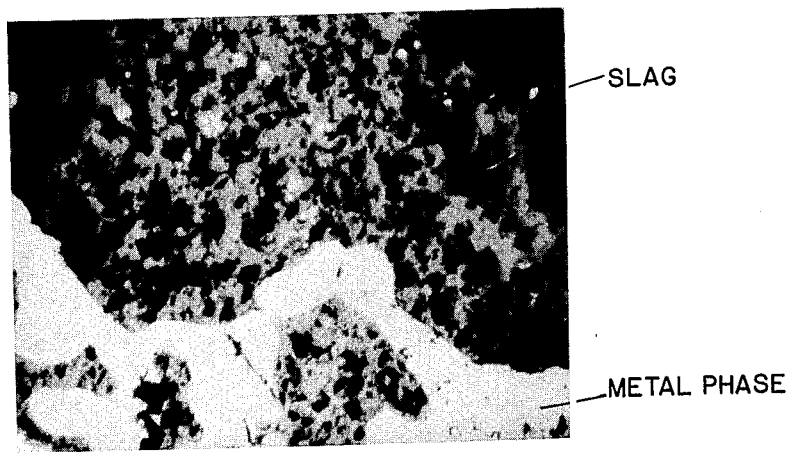
FIG. 2 is a photomicrograph taken after the reduction treatment showing the interface between the dense metal phase (a) which precipitates to the bottom and slag phase (b).

FIG. 2 of the drawing is a photomicrograph of the coarse slag after the thermal reduction treatment showing the nickel-iron alloy which precipitates to the bottom of the reduction zone.

Figure 3:
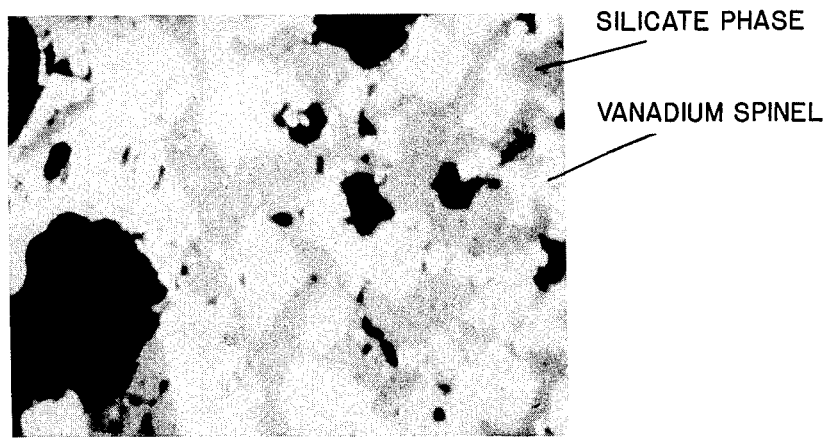
FIG. 3 is a photomicrograph taken after the reduction treatment showing the enriched vanadium spinel phase (a) that floats to the top of the sample.

FIG. 3 of the drawing is a photomicrograph of the coarse slag after reduction treatment showing the silicate phase with abundant vanadium spinel phases that float to the top of the sample and which can be easily separated from the metal phase. The silicate slag composition before and after the thermal reduction treatment is shown in Table I. The vanadium concentration of the thermally reduced sample is in excess of 3 wt. % (vs. 1.0 wt. % of the untreated slag). It is also to be noted that calcium enriched silicate slag (after treatment) has a higher solubility of sulfur than does the silicate slag (before the treatment). (1.76–1.90) Wt % vs (1.26–1.34) wt. %).

TABLE I

| | Slag Analysis | | | |
|---|---|---|---|---|
| | After Reduction Treatment | | Before Reduction Treatment | |
| Al | 8.02 | 8.17 | 10.45 | 10.57 |
| Si | 34.74 | 33.87 | 45.65 | 44.95 |
| S | 1.76 | 1.90 | 1.34 | 1.26 |
| Ca | 19.11 | 19.41 | 5.67 | 5.57 |
| V | 3.38 | 3.09 | .95 | 1.0 |
| Fe | 30.45 | 30.80 | 31.89 | 32.18 |

Various modifications of the invention as herein before set forth may be made without departing from the spirit and scope thereof, and therefore, only such limitations should be made as are indicated in the appended claims.

I claim:

1. A partial oxidation process for producing synthesis gas, reducing gas, or fuel gas and two separate by-product slag materials which are respectively rich in vanadium and nickel comprising:
    (1) reacting an ash-containing fuel feedstock comprising petroleum coke and/or heavy liquid hydrocarbonaceous fuel, wherein said ash comprises compounds of V, Ni and Si, by partial oxidation in a free-flow unobstructed vertical gas generator in the presence of a free-oxygen containing gas, temperature moderator, and an iron-containing additive in the amount of about one to ten parts by weight of additive to one part by weight of the ash in said fuel feedstock and at least 5 parts by weight of iron for each part by weight of vanadium, at a temperature in the range of about 2100° F. to 3000° F. in a reducing atmosphere, a pressure in the range of about 1 to 200 atmospheres, an O/C (atomic ratio) in the range of about 0.3 to 1.5, and a $H_2O$/fuel feedstock weight ratio in the range of about 0.1 to 5.0 to produce a hot raw effluent stream of synthesis gas, reducing gas, or fuel gas with entrained molten slag, and carbon-containing particulate material;
    (2) cooling the hot raw gas stream from (1), and separating by conventional methods coarse slag having a particle size of at least 40 mesh from fine slag and carbon-containing particulate materials having a particle size of less than 40 mesh;
    (3) heating the coarse slag from (2) while in contact with reducing gas in a thermal reduction zone wherein an equilibrium oxygen concentration is provided in the gas phase with a partial pressure of oxygen in the range of about $8.4 \times 10^{-20}$ to $1.1 \times 10^{-10}$ atmosphere and at a temperature in the range of about 1900° F. to 2600° F. and above the melting point of said slag to produce a molten bath of slag comprising the following immiscible phases in wt. %:
        (a) a dense metal phase in the amount of about 0.1 to 5.0 which precipitates to the bottom comprising a nickel-iron alloy containing about 5 to 60 wt. % of nickel;
        (b) a sulfur encapsulated slag phase in the amount of about 5.0 to 85 that floats on said phase (a) comprising iron silicate;
        (c) the remainder comprising vanadium-rich silicate and spinel phases comprising at least 3 wt. % vanadium which floats on said phase (b); and
    (4) separating said phases (a), (b) and (c) from each other.

2. The process of claim 1 wherein an additional material including an element selected from the group of elements consisting of copper, calcium, silicon, and mixtures thereof is introduced into the partial oxidation reaction zone along with the iron-containing additive.

3. The process of claim 1 wherein the total amount of said additional material is in the range of about 1.0 to 90.0 wt. % (basis weight or iron-containing additive).

4. The process of claim 1 wherein additional carbon values selected from the group consisting of fine slag, carbon-containing clarifier bottoms, carbon-containing particulate material, and mixtures thereof are introduced into the thermal reduction zone.

5. The process of claim 3 wherein up to 5.0 wt. % (basis weight of said corase slag) of said additional carbon values are introduced into the thermal reduction zone in admixture with said coarse slag.

6. The process of claim 1 provided with the step of safely disposing of said sulfur-encapsulated slag phase (3)(b) without contaminating the environment.

7. The process of claim 1 provided with the step of safely disposing of said sulfur-encapsulated slag phase (3)(b) as landfill.

8. The process of claim 1 wherein the reducing gas in (3) is selected from the group consisting of $H_2$, gaseous mixtures comprising $H_2 + CO$, a portion of the product gas, and mixtures thereof.

9. The process of claim 1 wherein said heavy liquid hydrocarbonaceous fuel is selected from the group consisting of virgin crude, residua from petroleum distilltion and cracking, petroleum distillate, reduced crude, whole crude, asphalt, coal tar, coal derived oil, shale oil, tar sand oil, and mixtures thereof.

10. The process of claim 1 wherein said iron-containing additive is selected from the group consisting of elemental iron; iron compounds including oxides, sulfides, carbonates, cyanides, nitrates; and mixtures thereof.

11. The process of claim 2 wherein said copper-containing material in selected from the group consisting of oxide, sulfide, sulfate, hydroxide, carbonate, cyanide, chloride, nitrate and mixtures therof.

12. The process of claim 2 whrein said silicon-containing material is selected from the group consisting of silica, quartz, volcanic ash, and mixtures thereof.

* * * * *